(12) United States Patent
Kakivaya et al.

(10) Patent No.: US 7,475,058 B2
(45) Date of Patent: Jan. 6, 2009

(54) METHOD AND SYSTEM FOR PROVIDING A DISTRIBUTED QUERYING AND FILTERING SYSTEM

(75) Inventors: GopalaKrishna Reddy Kakivaya, Sammamish, WA (US); Michael J. Toutonghi, Bellevue, WA (US); Savithri Dani, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 762 days.

(21) Appl. No.: 10/017,689

(22) Filed: Dec. 14, 2001

(65) Prior Publication Data
US 2003/0115065 A1 Jun. 19, 2003

(51) Int. Cl.
*G06F 17/30* (2006.01)
(52) U.S. Cl. .......................................... 707/3; 707/10
(58) Field of Classification Search .......... 707/1–3, 707/104.1
See application file for complete search history.

(56) References Cited

U.S. PATENT DOCUMENTS

| 6,560,591 | B1 * | 5/2003 | Memmott et al. ............. 707/1 |
| 6,748,384 | B1 * | 6/2004 | Rylander et al. ............. 707/10 |
| 2001/0047352 | A1 * | 11/2001 | Todd ............................ 707/3 |
| 2002/0078068 | A1 * | 6/2002 | Krishnaprasad et al. .. 707/104.1 |
| 2002/0123984 | A1 * | 9/2002 | Prakash ........................ 707/1 |
| 2002/0123991 | A1 * | 9/2002 | Asami et al. .................. 707/3 |
| 2002/0156792 | A1 * | 10/2002 | Gombocz et al. ........... 707/100 |
| 2004/0162848 | A1 * | 8/2004 | Todd .......................... 707/102 |

OTHER PUBLICATIONS

Munakata, K., "Query Processing for Integration of Information Sources Based on a Self-Descriptive Object Model," *Systems and Computers in Japan*, 1999, 30(3), 10-22.
Cuppens, F. et al., "Rules for Designing Multilevel Object-Oriented Databases," *Computer Security—Esorics 98—5th European Symposium on Research in Computer Security*, Germany, 1998, 159-174.
Conference Paper (PA), "Interoperable Object Models for Large Scale Distributed Systems," 1995.

* cited by examiner

*Primary Examiner*—Debbie M Le
(74) *Attorney, Agent, or Firm*—Woodcock Washburn LLP

(57) ABSTRACT

In a distributed system querying and navigating data structures, databases, and XML documents in uniform and extensible manner is provided. Queries are defined that provide type information to a variety of digital objects. As such, the underlying data format is abstracted thereby allowing a single query to apply to multiple digital devices even though the multiple digital devices store their data in a different native format.

14 Claims, 9 Drawing Sheets

METHOD AND SYSTEM FOR PROVIDING A DISTRIBUTED QUERYING AND FILTERING SYSTEM

FIELD OF THE INVENTION

The present invention relates generally to the field of computing. More particularly, the invention relates to a system and method for querying data structures.

BACKGROUND OF THE INVENTION

Many digital devices such as PDAs, Cell phones, MP3 players, Picture Frames, and so on are available and gaining traction as essential digital devices. Other digital devices, such as personal computers and televisions, have already gained critical mass and are converging into key digital devices for homes and businesses. However, the utility of the devices would be greatly enhanced by a seamless connection among the various digital devices available to a user. As it now stands, all of the digital devices available to a user are not connected, resulting in a less than optimal island of experience. For example, it is generally not possible to access one's schedule or e-mail from a television. Increasing availability of broadband and the growth and evolution in home and business networks provides an opportunity to connect various devices at home to provide seamless user experience available any time, any where and on any device. Evolution of such a platform at home provides opportunity for ISVs, Telcos, and Satellite/Cable providers to deliver rich integrated services and experiences into home.

A number of software services are needed to enabling rich user experiences among the various digital devices available to users. Examples of such software services include Media Library service that aggregates media metadata from various devices at home, Media Transcoding service that can convert incoming analog such as terrestrial and cable analog data and digital formats such as MPEG2 and MP3 to an internal format such as WMV and WMA for storage and distribution within in home, storage service that devices can use to store persistent data, and calendaring services that maintains family schedule. At the application semantics layer, there should be no fundamental difference between the way a device interacts with a software service and vice-versa and the underlying infrastructure should fully support such an abstraction.

The wide range of digital devices and services available in homes and businesses are deployed/startup in no predefined order and as such it is essential for relationships/dependencies to be formed dynamically and tracked over a period of time. Discovery, rich query capabilities, and eventing (tracking service up/down events) form the basis for building infrastructure that supports establishment of dynamic, tracked relationships/dependencies. As distribution of media and device aggregation are core experiences, it is important for the underlying infrastructure to understand the input/output connections and the location of each device. Thus, connection and spatial information needs to be modeled as well.

In order to allow the wide range of digital devices and services to work together cohesively, it is important that any distributed environment in which they work be tolerant of differences among the various devices. For example, the various devices may have internal information storage formats that differ. Whereas one device may store data in a sql database, another may store data in an XML format. However, there is still a need to allow these disparate devices to communicate data to one another and allow devices to query data stored on other devices.

SUMMARY OF THE INVENTION

The invention provides a mechanism to query data structures at the data type level. By providing a query mechanism, the invention provides a layer of abstraction between the query language and the underlying data. Queries are specified by providing a type and/or value to compare with. This mechanism is agnostic about the underlying data structure storage whether it is in-memory, a database, or an xml document. As a result, a distributed query system is enabled that may have a plurality of devices each having different data storage formats to be queried by the same query string. Devices having programming language data structures; sql databases, or xml file formats are all queriable in a uniform way using the query language defined by this invention.

The present invention addresses the above described requirements by defining a complete query system at the type system level in the form of various query objects that can be used to traverse any data structure to filter and select interesting instances. An example Query object is the one that can be used to select instances of a particular constructed type, say Person, and filter on its field values, say Name and Age, satisfying some predefined Boolean expressions such as "Name field of type string starts with Joe" and "Age field of type int less that 30 but greater than 20". The query system can also be used to discover services in a distributed computing environment by querying data structures stored by various computing devices connected to the distributed environment.

As the query objects are defined at the type system level, they can be applied on any data structure maintained in any format and as such are format agnostic. They can easily be mapped to SQL and XML queries.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise.

Figure 1:
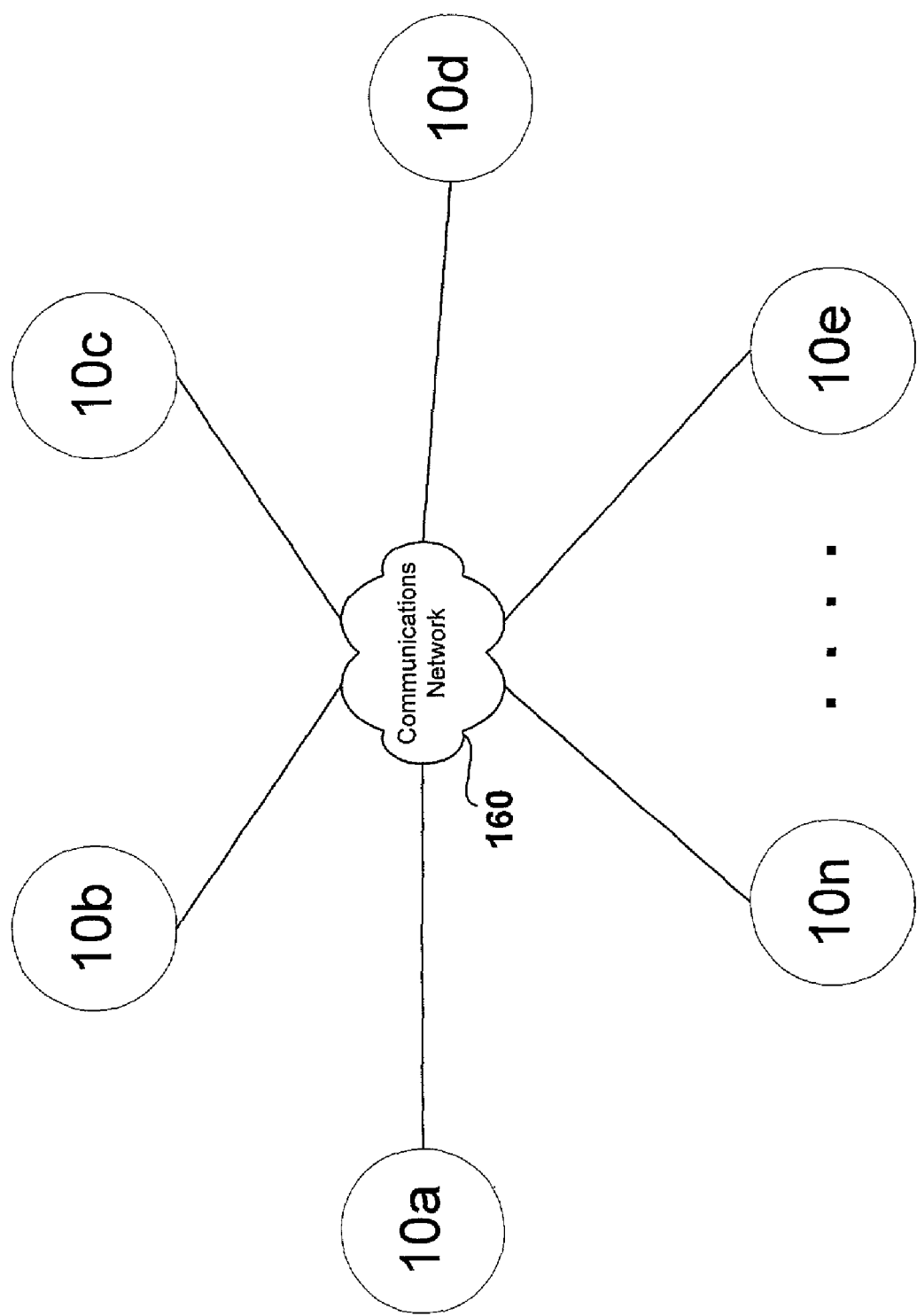
FIG. 1 is a diagram of an exemplary distributed system in which various objects communicate with each other in a communications network.

FIG. 1 provides a schematic diagram of a distributed computing environment. The distributed computing environment comprises computing objects 10A-10n. These objects may comprise programs, methods, data stores, programmable logic, etc. The objects comprise portions of the same or different devices such as PDAs, televisions, MP3 players, Televisions, personal computers, etc. Each object can communicate with another object by way of the communications network 160. This network may itself comprise other computing objects and computing devices that provide services to the system of FIG. 1. In accordance with an aspect of the invention each object 10a-10n may contain services and data that would provide benefits to other of the objects 10a-10n. For example, where one of the objects may process MP3 data, another of the objects may provide an audio output of MP3 data or where on object may contain digital video data, another object may provide digital video output, and so on. In order to provide such benefits, objects 10a-10n require capabilities that allow them to access the resources controlled or maintained by the other objects.

In a distributed computing architecture, computers that may have traditionally been used solely as clients communicate directly among themselves and can act as both clients and servers, assuming whatever role is most efficient for the network. This reduces the load on servers and allows all of the clients to access resources available on other clients thereby increasing the capability of the entire network.

Distributed computing can help businesses deliver services and capabilities more efficiently across diverse geographic boundaries. Moreover, distributed computing can move data closer to the point at which it is actually consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, Intelligent agents can be used to prioritize tasks on a network, change traffic flow, search for files locally or determine anomalous behavior such as a virus and stop it before it effects the network.

Computing Environment

Figure 2:
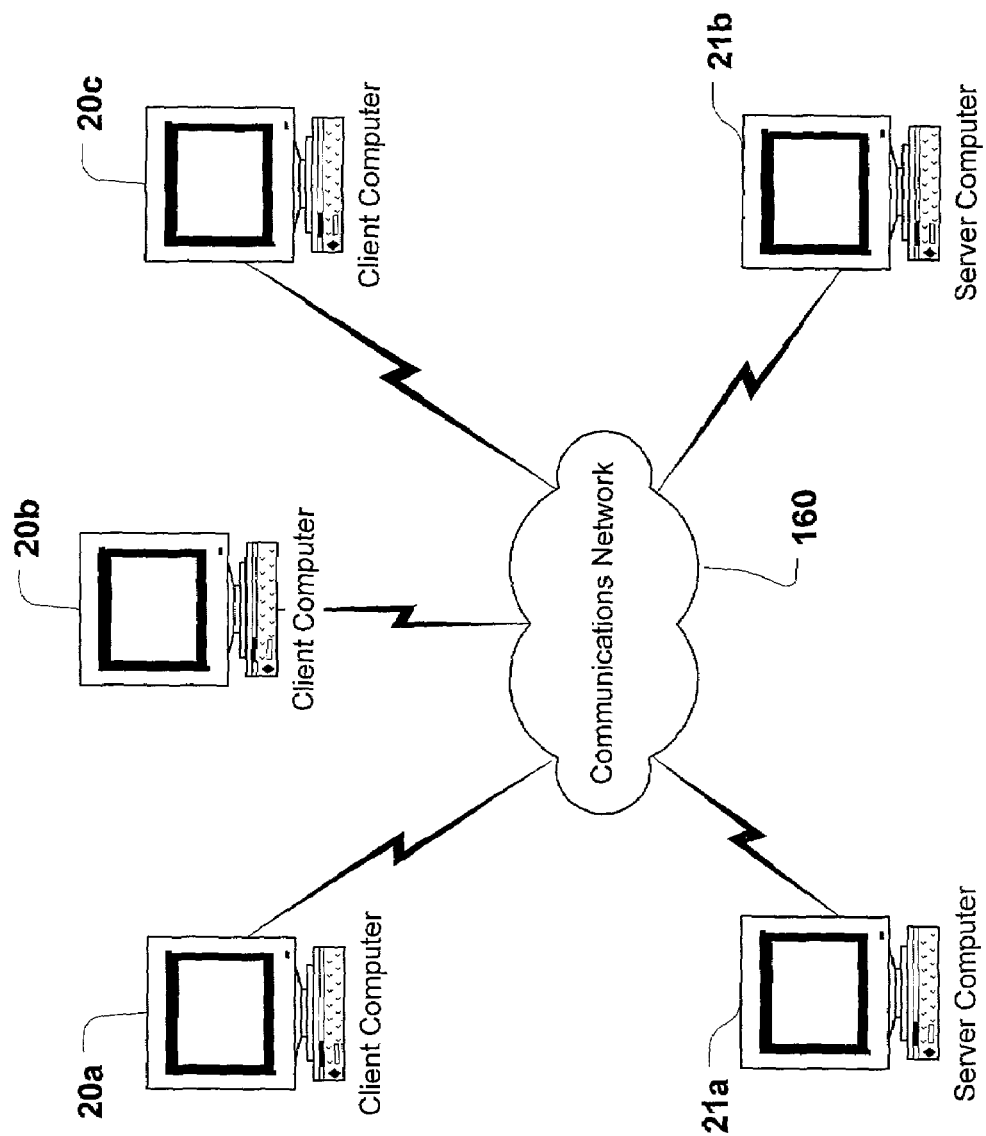
FIG. 2 is an example of a computer network wherein aspects of the present invention may be employed.

FIG. 2 illustrates how the objects of FIG. 1 may be implemented in a physical environment. Here computers 20a-20c and 21a-21b may host various ones of the objects of FIG. 1. Although the physical environment shows the connected devices as computers, such illustration is merely exemplary and may comprise various digital devices such as PDAs, televisions, MP3 players, etc.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks.

In home networking environments, there are at least four disparate network transport media that may each support a unique protocol such as Power line, data (both wireless and wired), voice (telephone) and entertainment media. Most home control devices such as light switches and appliances will use power line for connectivity. Data Services enters home as broadband (either DSL or Cable modem) and is accessible within home using either wireless (HomeRF or 802.11b) or wired (Home PNA, Cat 5, even power line) connectivity. Voice traffic will enter the home either as wired (Cat 3) or wireless (cell phones) and distributed within the home using Cat 3 wiring. Entertainment Media enters home either through satellite or cable and is typically distributed in the home using coaxial cable. IEEE 1394 and DVI are also emerging as digital interconnects for clusters of media devices. All of these network environments may be interconnected to form an intranet that may be connected to the outside world by way of the Internet.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). In the example of FIG. 1, computer 20 can be thought of as the client and computer 10 can be thought of as the server where server 10 maintains the data that is then replicated in the client computer 20.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Illustrative Computer Network Environment

In general, the computer network may comprise both server devices and client devices deployed in a network environment (in a peer-to-peer environment devices may be both clients and servers). FIG. 2 illustrates an exemplary network environment, with server computers in communication with client computers via a network, in which the present invention may be employed. As shown in FIG. 2, a number of servers 21a, 21b, etc., are interconnected via a communications network 160 (which may be a LAN, WAN, intranet or the Internet, or a combination of any of these) with a number of client computers 20a, 20b, 20c, etc. Moreover, communication network 160 may comprise wireless, wireline, or combination wireless and wireline connections.

Thus, the present invention can be utilized in a computer network environment having client computers for accessing and interacting with the network and a server computer for interacting with client computers. However, the systems and methods of the present invention can be implemented with a variety of network-based architectures, and thus should not be limited to the example shown. The present invention will now be described in more detail with reference to an illustrative implementation.

Figure 3:
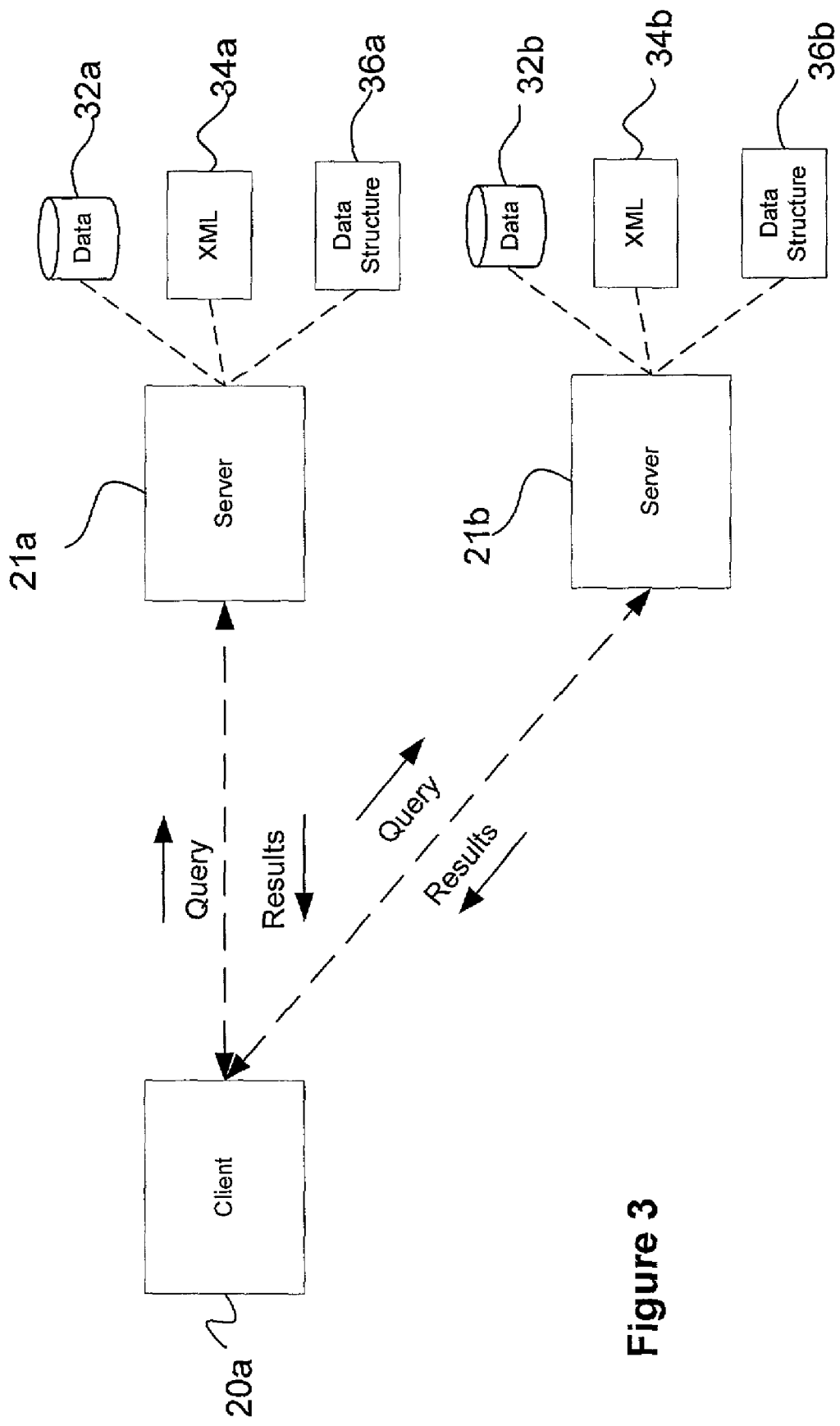
FIG. 3 is a more detailed illustration of the operation of the present invention to for one object in the network of FIG. 1 to query objects across the computer network.

FIG. 3 illustrates digital devices 20a, 21a, and 21b wherein client device 20a queries the data maintained by digital devices 21a and 21b. The data maintained by digital devices 21a and 21b may be one or more of database 32a, 32b, XML file 34a, 34b, or data structure 36a, 36b. Notably, digital device 21a and 21b may store their respective data in different formats. For example, digital device 21a may store the data as a database whereas digital device 21b may store its data as a data structure. Moreover, it would be advantageous if client digital device 20a did not have to know the particular format in which the data is stored by the server digital device 21a and 21b. By remaining agnostic about the format of data stored by server digital devices 21a and 21b, client digital device 20a can merely transmits a query to server digital devices 21a and 21b and allow the server digital devices 21a, 21b translate the query to the appropriate format for querying its respective data (e.g., database 32a, 32b, XML file 34a, 34b, or data structure 36a, 36b). Additionally, in a distributed computing environment, a client can merely broadcast a query to all digital devices in a network and have each digital device transform the query to the appropriate internal format, perform the local query, and transmit the results back to the requesting client.

Figure 4:
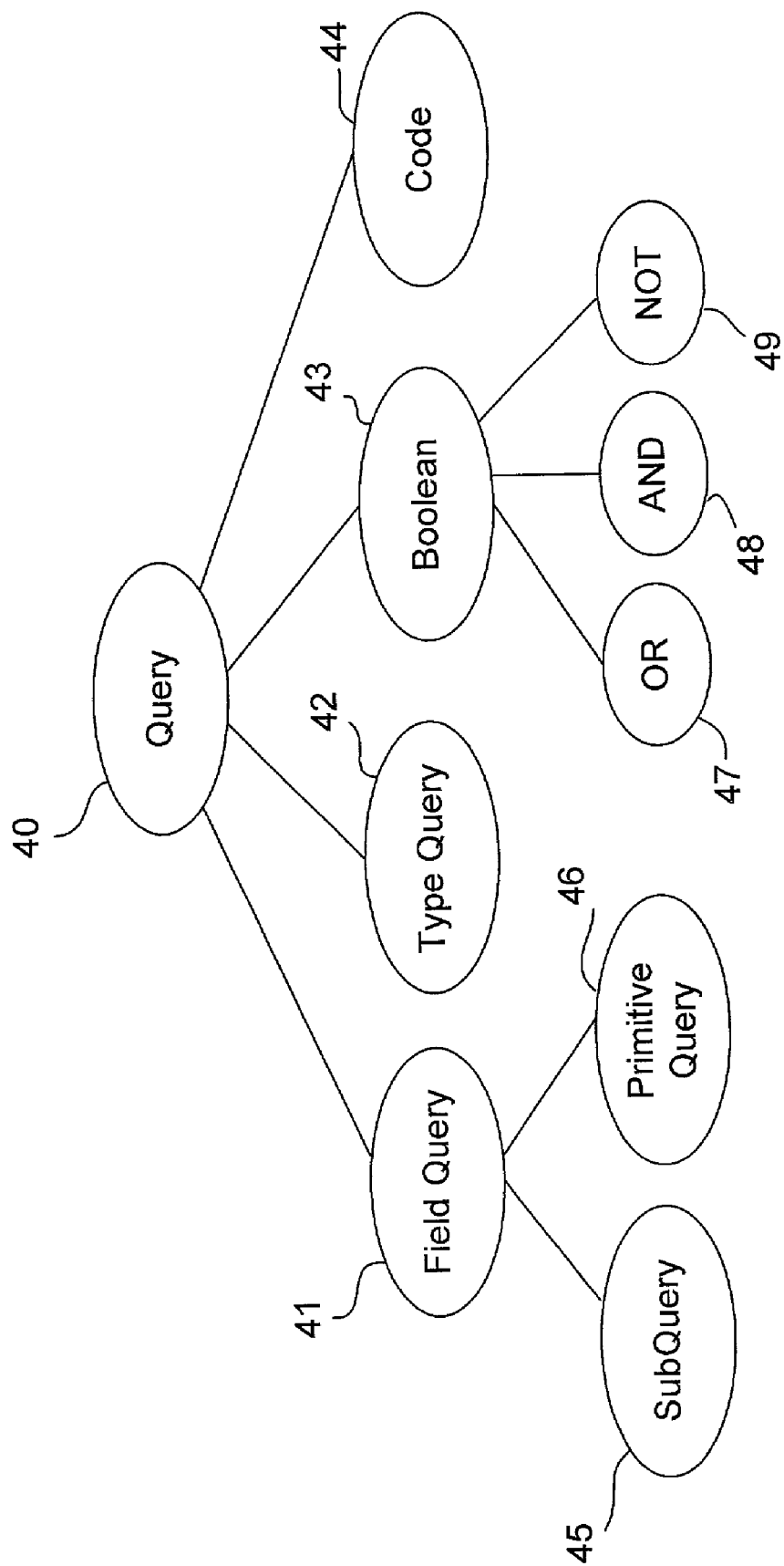
FIG. 4 is an illustration of a hierarchy of query types in accordance with the invention.

In order for all of the devices to participate in this distributed query, each device must communicate in a higher level query language that permits operations that can be transformed into the appropriate format. FIG. 4 shows a hierarchy of query types in accordance with an aspect of the invention. Each query 40 is comprised of one or more Field queries 41, Type Queries 42, Boolean Queries 43, or Code 44 (e.g., applets such as Common Language Runtime (CLR), C#, or JAVA that are downloaded for execution on the server device). A Field Query 41 is comprised of either a SubQuery 45 or a Primitive Query 46. A Boolean Query 43 comprises an OR 47, an AND 48, or a NOT 49.

Figure 5A:
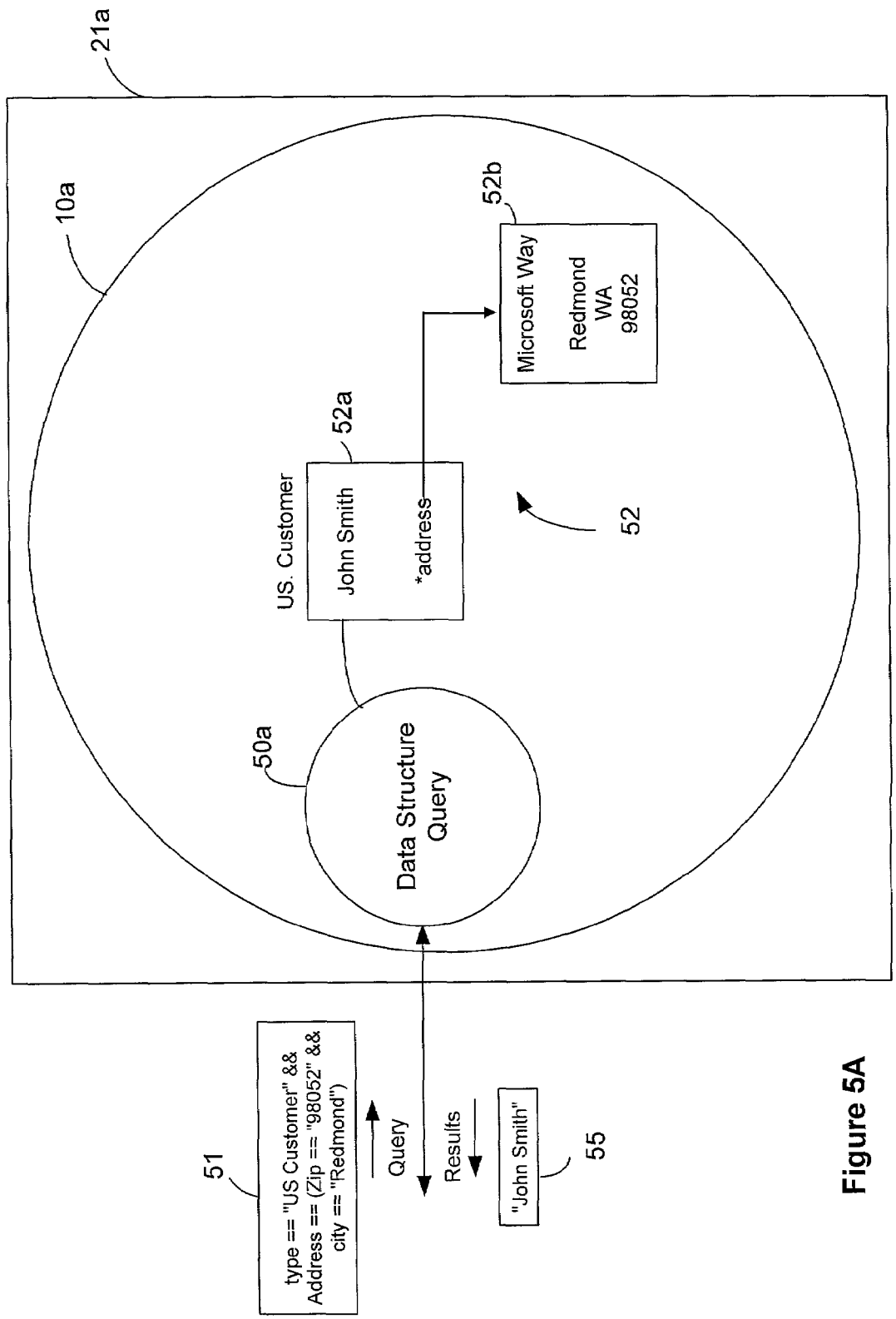
FIG. 5A is an example a data structure that may be queried in accordance with an aspect of the invention.
Figure 5B:
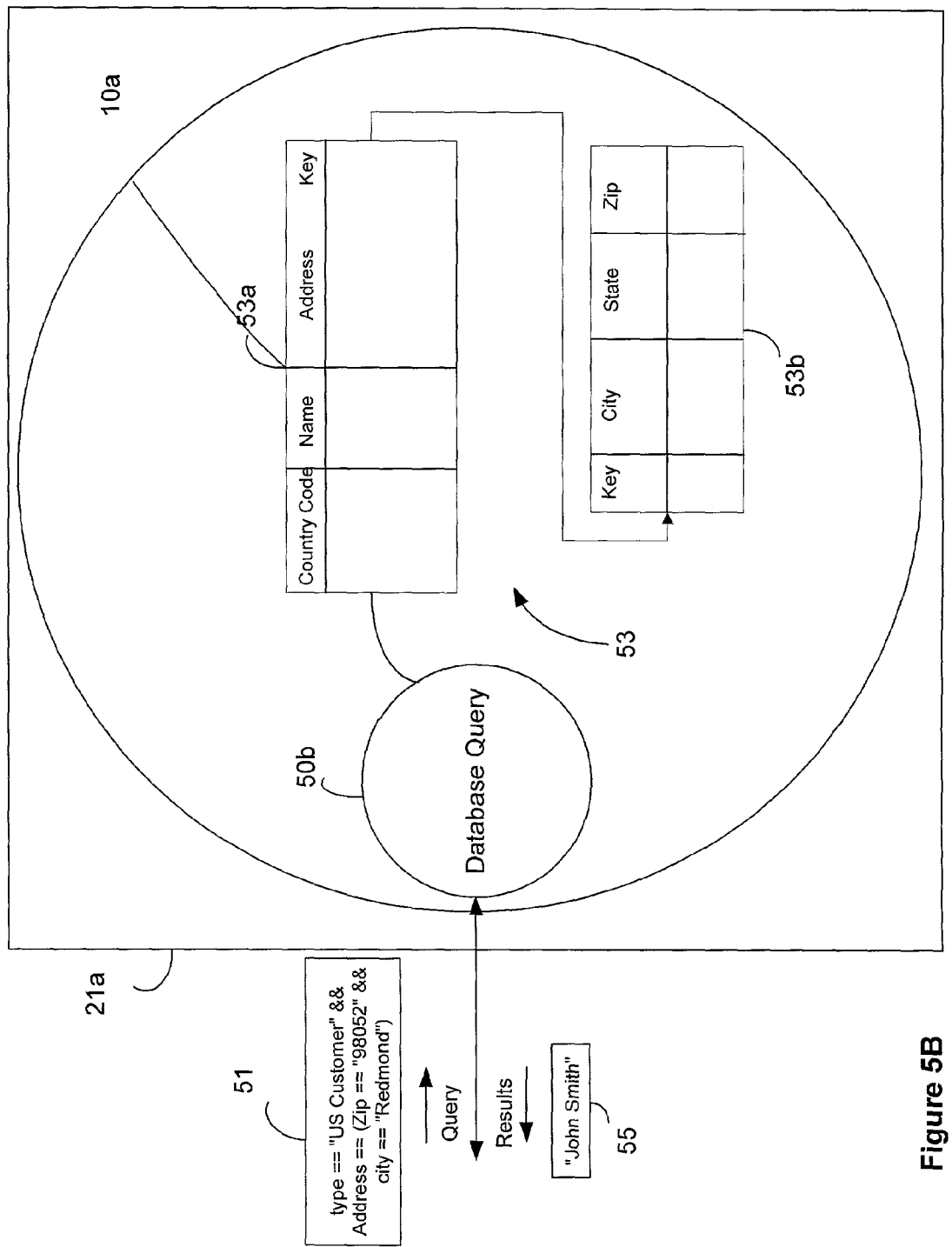
FIG. 5B is an example of a portion of a database that may be queried in accordance with an aspect of the present invention.
Figure 5C:
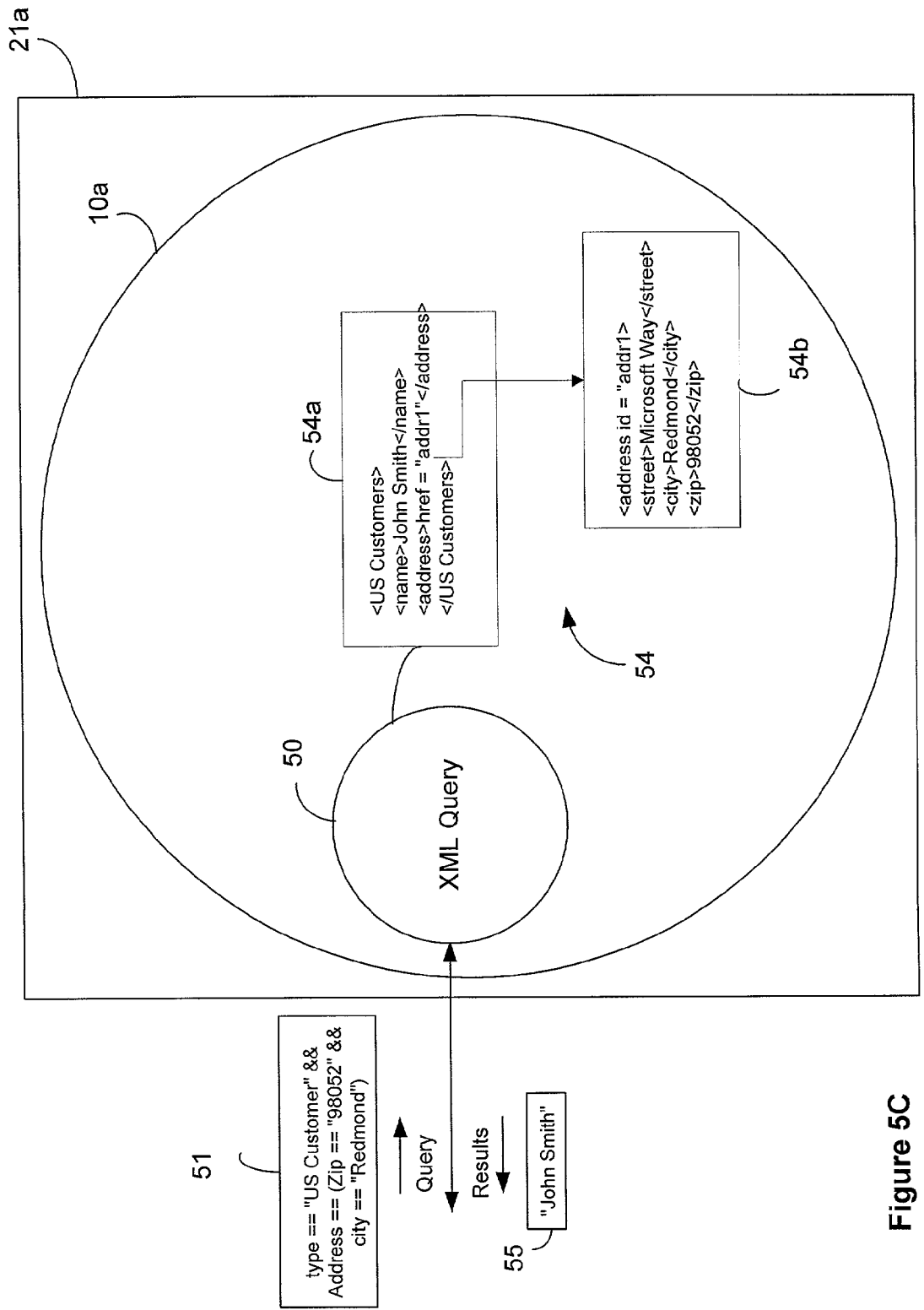
FIG. 5C is an example of XML pages that may be queried in accordance with an aspect of the present invention.

All of these query constructs can be transformed into essentially any underlying data storage construct by the server device. FIGS. 5A-5C illustrate this facet of the invention. FIGS. 5A-5C represent object 10a that is hosted by digital device 21a. In each example, the underlying data is stored in a different format. In the example of FIG. 5A, the underlying data is stored as a data structure 52. In the example of FIG. 5B, the underlying data is stored in a database 53. And in the example of FIG. 5C, the underlying data is stored as XML pages 54. Additionally, in each of FIGS. 5A-5C, object 10a is presented with the query 51 requesting:

FIG. 5A illustrates the operation of the query wherein the underlying data is stored in the format of a programming language data structure. For example, a data structure US_Customer can be define as:

```
Class US_Customer
{
    string name;
    Address *address;
}
class Address
{
    string street;
    string city;
    string zip;
}
```

Alternatively, the underlying data structure could be defined as tables in an database such as sql as:

```
CREATE TABLE US_CUSTOMER
(
    name varchar,
    addressId int
    CONSTRAINT FK_ADDRESS_ID FOREIGN KEY (addressId)
REFERENCES ADDRESS (addressId)
)
CREATE TABLE ADDRESS
{
    addressId int PRIMARY KEY,
    street varchar,
    city varchar,
    zip varchar
}
```

The underlying data structure may be represented by an XML schema, for example, the following XML schema fragment would be used to define a structure in XML:

```
<complexType name = "US_Customers">
    <sequence>
        <element name="name" type="string"/>
        <element name="address" type="Address"/>
    </sequence>
</complexType>
<complexType name = "Address">
    <sequence>
        <element name="street" type="string"/>
        <element name="city" type="string"/>
        <element name="zip" type="string"/>
    </sequence>
</complexType>
```

The present invention provides for querying the various objects at the type system level. As such the underlying data structure is abstracted and therefore the same query can be applied to an object independent of how that object stores its data. By defining a query system at the type system level, a mechanism is defined that can be used to traverse any data structure to filter and select interesting instances. An example Query object is the one that can be used to select instances of a particular constructed type, say Person, and filter on its field values, say Name and Age, satisfying some predefined Boolean expressions such as "Name field of type string starts with Joe" and "Age field of type int less that 30 but greater than 20".

As the query objects are defined at the type system level, they can be applied on any data structure maintained in any format and as such are format agnostic. They can easily be mapped to sql and xml queries. The following query example in conjunction with FIGS. 5A-5C further illustrates the process:

Type=="US Customer" && Address==(ZIP=="98052" && City="Redmond")

After applying this query to each of the different instances of object 10 defined in FIG. 5A-5C, an identical reply 55 indicting "John Smith" is received, even though the underlying data format is different.

Figure 6:
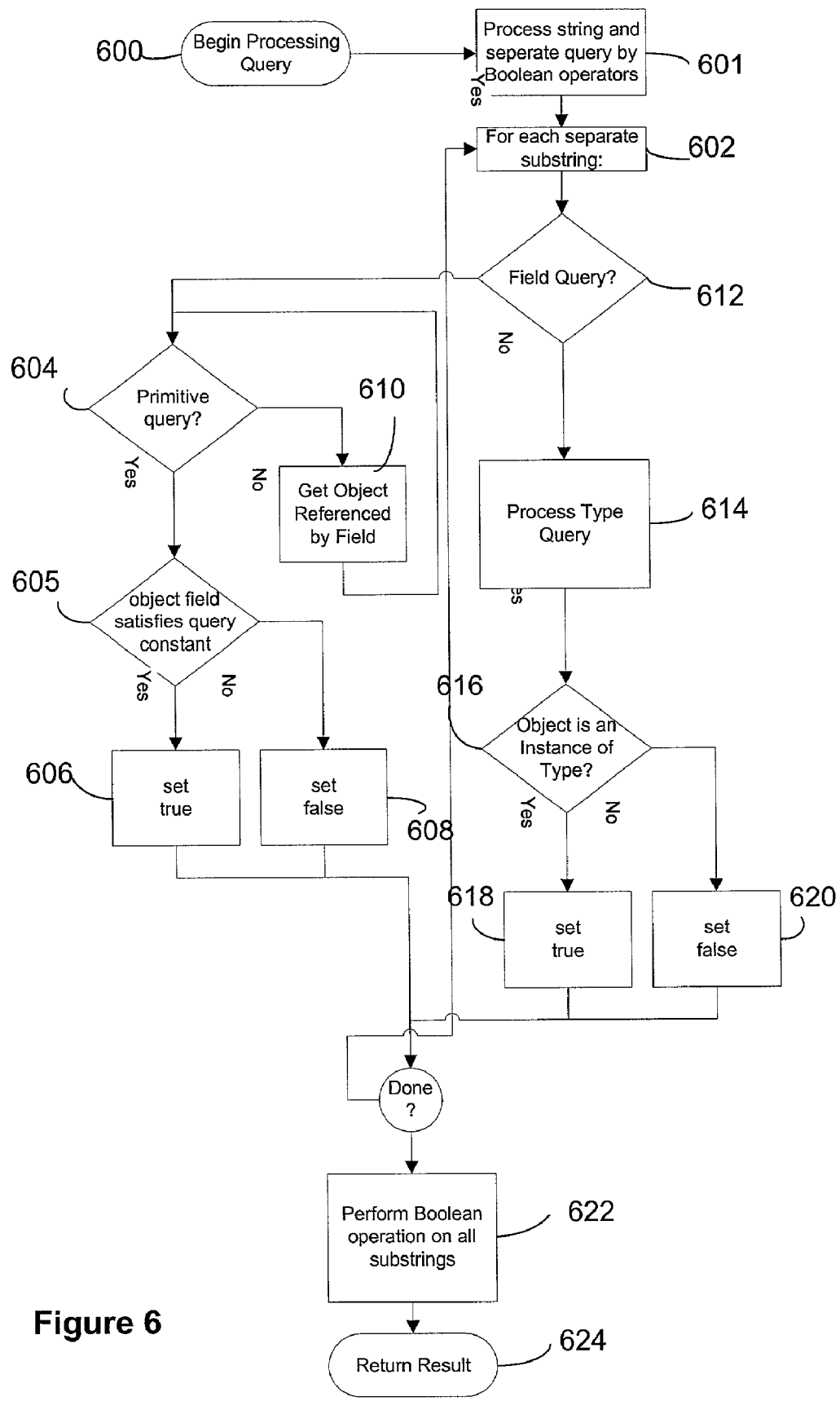
FIG. 6 is a flow chart for walking through a query in accordance with the invention.

FIG. 6 is a flow chart illustrating a method for processing the high level string query, such as the example query 51 of FIG. 5A, to query a data structure such as the data structure 52 of FIG. 5A. Initially, the process starts when a query is submitted to an object having data in a data structure format (step 600). The query is then separated by Boolean operators (e.g., "type='US Customers'" is separated from "Address== (ZIP=='98052' && City='Redmond')", and the subqueries are also separated by Boolean operators) (step 601). Then each separate substring is tested in accordance as either a Filed Query (step 612) or a Type Query (step 614). If the substring is a Field query (e.g., "Address==(ZIP=='98052) &&(City='Redmond')", the field is tested to determine if it is a Primitive Query or a SubQuery (step 604). If it is a SubQuery (e.g., "Address" is a SubQuery because it references by way of a pointer) then the the referenced object is retrieved (step 610). Those skilled in the art will recognize that SubQueries may also be compound in that they may contain fields separated by Boolean operators; however, for simplicity, the flow chart does not illustrate such a process. The SubQueries would be processed much the same way by separating the queries by Boolean operator and processing them accordingly. After the object referenced by the field is retrieved, the field is again tested to determine if it is a primitive query or a Subquery. After all of the referenced objects are resolved, the primitive query processes the field to determine if the field satisfied the constant (e.g., "ZIP=='98052'") (step 605). If the answer is yes, it sets a value indicative of success (e.g., "TRUE") (step 606). Otherwise, a value is set indicative of failure (e.g., "FALSE") (step 608). Processing of that substring is complete and the next is process.

If the test made to determine if it was a Field Query (step 612) returned negative, then it must be a Type Query (e.g. type="US Customer") and a test is made to determine if the data object is of the selected type. If it is a value is set to indicated success (step 618). Otherwise, a value is set to indicate failure (step 620). After all of the sustrings have been processed, the Boolean operators are applied (step 622). The result is returned (i.e. output) (step 624).

Although FIG. 6 illustrates the result returning "TRUE" or "FALSE', the actual output returned from the query could be any other output maintained by the query object. So that, for example, the system could be designed to return the name of the customer (i.e. "John Smith" in the above example) where the US Customer has the selected attributes. Such a system could be used to select stock quotes, determine whether a device has a particular attribute, and so on.

If the data is stored in a database format, such as in the example of FIG. 5B, the string query is converted into the appropriate language (e.g., Structured Query Language (SQL)). In that case, SubQueries are mapped to joins on foreign keys and joined as appropriate and field queries are mapped to column names. Type queries are mapped to table names or to change the selection criteria for particular rows. For example the query:

Type=="US Customer" && Address==(ZIP=="98052" && City="Redmond")

would map to:
SELECT*
FROM US_CUSTOMER as C, ADDRESS as A ON (C.addressId=A.addressId and A.zip="98052" AND A.city="Redmond")

If the data is stored in XML format, such as in the example of FIG. 5C, the string query is converted into the appropriate language (e.g., XPATH or XQUERY). In that case, SubQueries are mapped to joins on "href" and "id". Type queries are mapped to XML types:

Type=="US Customer" && Address==(ZIP=="98052" && City="Redmond")

would map to:

```
FOR $cust in //US_Customer
WHERE $cust INSTANCEOF US_Customer
    AND $cust/address/zip="98052"
    AND $cust/address/city="Redmond"
RETURN $cust
```

Figure 7:
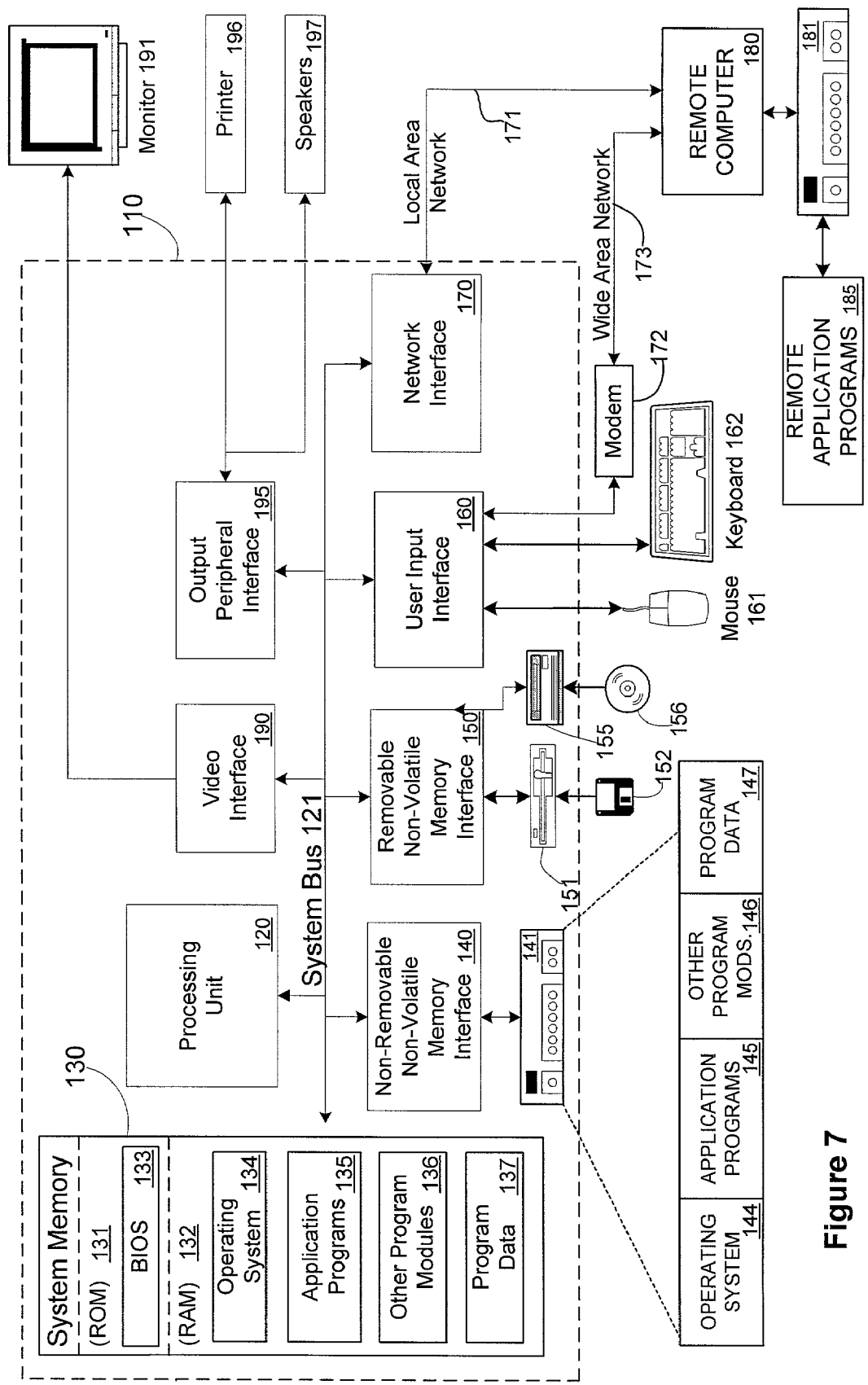
FIG. 7 is a block diagram of an exemplary computing environment in which aspects of the invention may be implemented.

With reference to FIG. 7, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

Computer 110 may also include other removable/non-removable, volatile/nonvolatile computer storage media. By way of example only, FIG. 7 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices may include a microphone 163, joystick, game pad, satellite dish, scanner, or the like (not shown). These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices such as personal computers and PDAs, one skilled in the art will recognize that the present invention is not limited to such digital devices, as described in the present application may apply to any number of existing or emerging computing devices or environments, such as a gaming console, handheld computer, portable computer, DVD players, VCRs, home appliances, etc. whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A computer-implemented method performed by a computing device for querying a data structure in a distributed computing environment, comprising:
    preparing a query specifying the constraints to be applied on at least two different data structures wherein each data structure comprises substantially the same information wherein the information is stored in a different data format type and where each data structure is queried according to a different format type wherein the data structure is stored as one of XML, database tables, and a programming language data structure;
    sending the query to at least two different objects wherein each object maintains one of the at least two different data structures in-memory and determines whether the in-memory data structure maintained by each object satisfies the query; and
    receiving the results from the query from the at least two different objects wherein the query results are returned in substantially identical formats.

2. The method as recited in claim 1 wherein the query is specified as a text string.

3. The method as recited in claim 1 further comprising receiving a data value from at least one digital device indicative of the storage of the value in said digital device wherein one of the at least two different objects resides on the digital device.

4. The method as recited in claim 3 wherein the digital device comprises one of a personal computer, personal digital assistant, video tape recorder, a display device, and an MP3 player.

5. The method as recited in claim 1 wherein the query is sent in the form of a message over a data network.

6. A system for determining the status of a device, comprising:
    a processor;
    a query generation mechanism for generating a type query specifying a data type and a value wherein the query can be to be applied on at least two different data structures wherein each data structure maintains substantially the same information but wherein the information is stored in a different data format type, wherein the data structure is stored as one of XML, database tables, and a programming language data structure;
    a query transmission mechanism for transmitting the type query and the value over a communication network to at least two digital devices whereby each digital device compares the data type to a data type of a data structure that it maintains in-memory and compares the value to a value stored in the data structure wherein said data structure is one of the different format types; and
    a results acceptance mechanism wherein the results returned from each of the at least two different data structures are substantially the same.

7. The system as recited in claim 6 wherein the query is specified as a text string.

8. The system as recited in claim 6 further comprising a receiving mechanism for receiving a data value from at least one digital device indicative of the storage of the value in said digital device.

9. The system as recited in claim 6 wherein the digital device comprises one of a personal computer, personal digital assistant, video tape recorder, a display device, and an MP3 player.

10. A computer-readable storage medium having stored thereon computer readable instructions for querying a data structure in a distributed computing environment when executed on a computing device, comprising:
    computer instructions for preparing a query specifying the constraints to be applied on at least two different data structures wherein each data structure comprises substantially the same information wherein the information is stored in a different data format type and where each data structure is queried according to a different format type wherein the data structure is stored as one of XML, database tables, and a programming language data structure;
    computer instructions for sending the query to at least two different objects wherein each object maintains one of the at least two different data structures in-memory and determines whether the in-memory data structure maintained by each object satisfies the query; and
    computer instructions for receiving the results from the query from the at least two different objects wherein the query results are returned in substantially identical formats.

11. The computer-readable storage medium as recited in claim 10 wherein the query is specified as a text string.

12. The computer-readable storage medium as recited in claim 10 further comprising receiving a data value from at least one digital device indicative of the storage of the value in said digital device wherein one of the at least two different objects resides on the digital device.

13. The computer-readable storage medium as recited in claim 12 wherein the digital device comprises one of a personal computer, personal digital assistant, video tape recorder, a display device, and an MP3 player.

14. The computer-readable storage medium as recited in claim 10 wherein the query is sent in the form of a message over a data network.

* * * * *